United States Patent
Christmas et al.

(10) Patent No.: US 10,712,898 B2
(45) Date of Patent: Jul. 14, 2020

(54) SYSTEM AND METHOD FOR CUBIC GRAPHICAL USER INTERFACES

(71) Applicants: Coy Christmas, Superior, WI (US); Luke Malpass, Stoke-on-Trent (GB); Parnell Lutz, Duluth, MN (US)

(72) Inventors: Coy Christmas, Superior, WI (US); Luke Malpass, Stoke-on-Trent (GB); Parnell Lutz, Duluth, MN (US)

(73) Assignee: FASETTO, INC., Superior, WI (US)

( * ) Notice: Subject to any disclaimer, the term of this patent is extended or adjusted under 35 U.S.C. 154(b) by 271 days.

(21) Appl. No.: 14/197,517

(22) Filed: Mar. 5, 2014

(65) Prior Publication Data

US 2014/0258938 A1     Sep. 11, 2014

Related U.S. Application Data

(60) Provisional application No. 61/773,003, filed on Mar. 5, 2013.

(51) Int. Cl.
*G06F 3/0481*     (2013.01)
*H04L 12/58*      (2006.01)
(Continued)

(52) U.S. Cl.
CPC .......... *G06F 3/04815* (2013.01); *G06F 2203/04802* (2013.01); *G06Q 10/10* (2013.01);
(Continued)

(58) Field of Classification Search
CPC ....... G06F 3/04815; G06F 2203/04802; G06F 3/0481
See application file for complete search history.

(56) References Cited

U.S. PATENT DOCUMENTS 5,303,388 A  *  4/1994  Kreitman ............ G06F 3/04815
                                                    715/836
5,664,228 A      9/1997  Mital
                  (Continued)

FOREIGN PATENT DOCUMENTS

AU      2013352236      11/2018
CN      103945003        7/2001
                  (Continued)

OTHER PUBLICATIONS

Author: Dusk Jockeys Title: Dust Jockyes Android Apps Date: Mar. 7, 2012 pp. 1-5.*
(Continued)

*Primary Examiner* — Ajay M Bhatia
*Assistant Examiner* — Phoebe X Pan
(74) *Attorney, Agent, or Firm* — Snell & Wilmer L.L.P.

(57) ABSTRACT

Systems, methods, and computer program products for cube graphical user interfaces are disclosed. A cube may be a two dimensional representation of a three dimensional object. The cube may contain a file or application on each face of the cube. The cube may be rotated such that a user may view the desired cube face. The various cube faces may be user profiles, and in response to a user profile being selected, the content and appearance of a screen may change to settings associated with the user profile. Cubes may also be sent as attachments to an email or message. One cube attachment may contain a file on each cube face. Cubes may be used for analytic purposes. Data may be presented on each cube face in the form of a graph, and the various graphs may be merged to show relationships between the individual graphs.

30 Claims, 7 Drawing Sheets

US 10,712,898 B2

Page 2

(51) Int. Cl.
*G06Q 10/10* (2012.01)
*H04L 12/24* (2006.01)

(52) U.S. Cl.
CPC .......... *H04L 41/026* (2013.01); *H04L 51/066* (2013.01); *H04L 51/08* (2013.01); *H04L 51/10* (2013.01)

(56) References Cited

U.S. PATENT DOCUMENTS

| | | | |
|---|---|---|---|
| 5,678,015 A * | 10/1997 | Goh | G06F 3/04815 345/419 |
| 5,689,287 A * | 11/1997 | Mackinlay | G06T 3/0025 345/427 |
| 5,689,654 A | 11/1997 | Kikinis et al. | |
| 5,729,471 A | 3/1998 | Jain | |
| 5,956,038 A * | 9/1999 | Rekimoto | A63F 13/12 345/419 |
| 5,963,215 A * | 10/1999 | Rosenzweig | G06F 3/04815 345/649 |
| 5,982,295 A | 11/1999 | Goto et al. | |
| 6,002,403 A * | 12/1999 | Sugiyama | G06F 3/04815 715/717 |
| 6,008,809 A | 12/1999 | Brooks | |
| 6,029,183 A | 2/2000 | Jenkins | |
| 6,160,488 A | 12/2000 | Honda | |
| 6,489,932 B1 | 12/2002 | Chitturi | |
| 6,497,367 B2 | 12/2002 | Conzola et al. | |
| 6,553,360 B1 * | 4/2003 | Hoekstra | G06N 5/046 706/47 |
| 6,581,068 B1 * | 6/2003 | Bensoussan | G06F 17/30457 |
| 6,597,358 B2 * | 7/2003 | Miller | G06F 3/04815 345/427 |
| 6,652,170 B1 | 11/2003 | Arnold | |
| 6,710,788 B1 * | 3/2004 | Freach | G06F 3/0481 715/778 |
| 6,922,815 B2 * | 7/2005 | Rosen | G06F 17/30873 707/E17.111 |
| 6,938,218 B1 * | 8/2005 | Rosen | G06F 3/04815 345/419 |
| 7,054,963 B2 | 5/2006 | Betts-LaCroix | |
| 7,134,095 B1 * | 11/2006 | Smith | G06F 3/04812 715/860 |
| 7,149,836 B2 | 12/2006 | Yu | |
| 7,216,305 B1 * | 5/2007 | Jaeger | G06F 3/0481 345/419 |
| 7,428,702 B1 | 9/2008 | Cervantes et al. | |
| 7,480,872 B1 | 1/2009 | Ubillos | |
| 7,516,484 B1 | 4/2009 | Arnouse | |
| 7,533,408 B1 | 5/2009 | Arnouse | |
| 7,725,839 B2 * | 5/2010 | Michaels | G06F 3/0482 715/767 |
| 7,761,813 B2 * | 7/2010 | Kim | G06F 3/04815 715/836 |
| D654,931 S | 2/2012 | Lemelman | |
| 8,111,255 B2 * | 2/2012 | Park | G06F 3/0482 345/419 |
| 8,117,563 B2 * | 2/2012 | Ok | G06F 3/04815 345/419 |
| 8,260,828 B2 | 9/2012 | Dijk et al. | |
| 8,264,488 B2 * | 9/2012 | Ueno | G06Q 30/06 345/419 |
| 8,386,686 B2 | 2/2013 | Lin | |
| 8,390,255 B1 | 3/2013 | Fathollahi | |
| 8,405,502 B2 | 3/2013 | Teague | |
| 8,483,758 B2 | 7/2013 | Huang | |
| 8,497,859 B1 * | 7/2013 | Hickman | G06T 19/00 345/419 |
| 8,510,680 B2 * | 8/2013 | Kang | G06F 3/04815 715/768 |
| 8,587,590 B2 * | 11/2013 | Erickson | G06K 9/76 345/440 |
| 8,614,885 B2 | 12/2013 | Solomon | |
| 8,699,218 B2 | 4/2014 | Xu | |
| 8,745,535 B2 * | 6/2014 | Chaudhri | G06F 9/4443 715/782 |
| 8,810,430 B2 | 8/2014 | Proud | |
| 8,924,862 B1 * | 12/2014 | Luo | G06F 9/543 715/753 |
| 8,935,438 B1 | 1/2015 | Ivanchenko | |
| 9,047,050 B2 | 6/2015 | Medica | |
| 9,178,976 B2 | 11/2015 | Djordjevic | |
| 9,247,303 B2 * | 1/2016 | Phang | H04N 21/478 |
| 9,288,295 B2 | 3/2016 | Ivanovski | |
| 9,360,991 B2 * | 6/2016 | Celebisoy | G06F 3/04815 |
| 9,378,588 B2 * | 6/2016 | Song | G06F 3/04815 |
| 9,390,082 B1 * | 7/2016 | Stolte | G06F 17/246 |
| 9,405,435 B2 * | 8/2016 | Hendricks | G06F 3/0482 |
| 9,437,038 B1 | 9/2016 | Costello | |
| 9,495,375 B2 | 11/2016 | Huang | |
| 9,584,402 B2 | 2/2017 | Christmas et al. | |
| 9,626,341 B1 * | 4/2017 | Guan | G06F 17/2241 |
| 9,684,887 B2 | 6/2017 | Majeti et al. | |
| 9,886,229 B2 | 2/2018 | Christmas | |
| 10,075,502 B2 | 9/2018 | Malpass | |
| 10,084,688 B2 | 9/2018 | Christmas et al. | |
| 10,095,873 B2 | 10/2018 | Christmas et al. | |
| 10,123,153 B2 | 11/2018 | Christmas et al. | |
| 2001/0009605 A1 | 7/2001 | Ando | |
| 2001/0028369 A1 * | 10/2001 | Gallo | G06F 3/04815 715/848 |
| 2001/0033654 A1 | 10/2001 | Wieser | |
| 2001/0044578 A1 | 11/2001 | Ben-Haim | |
| 2002/0085681 A1 | 7/2002 | Jensen | |
| 2002/0105549 A1 | 8/2002 | Bowser et al. | |
| 2002/0105551 A1 * | 8/2002 | Kamen | G06F 3/04815 715/850 |
| 2002/0138543 A1 | 9/2002 | Teng | |
| 2003/0074529 A1 | 4/2003 | Crohas | |
| 2003/0126272 A1 | 7/2003 | Cori et al. | |
| 2003/0126335 A1 | 7/2003 | Silvester | |
| 2003/0131050 A1 | 7/2003 | Vincent | |
| 2003/0142136 A1 * | 7/2003 | Carter | G06F 3/04815 715/782 |
| 2003/0217097 A1 | 11/2003 | Eitel | |
| 2004/0088280 A1 | 5/2004 | Koh et al. | |
| 2004/0104932 A1 * | 6/2004 | Brebner | G06F 3/011 715/744 |
| 2004/0205091 A1 * | 10/2004 | Mulcahy | G06F 3/0481 |
| 2005/0005246 A1 * | 1/2005 | Card | G06F 3/04815 715/776 |
| 2005/0076216 A1 | 4/2005 | Nyberg | |
| 2005/0097008 A1 * | 5/2005 | Ehring | G06F 17/211 715/205 |
| 2005/0185364 A1 | 8/2005 | Bell | |
| 2005/0224589 A1 | 10/2005 | Park et al. | |
| 2005/0237704 A1 | 10/2005 | Ceresoli | |
| 2005/0271207 A1 | 12/2005 | Frey | |
| 2006/0020888 A1 * | 1/2006 | Kang | G06F 3/04815 715/708 |
| 2006/0057960 A1 | 3/2006 | Tran | |
| 2006/0075225 A1 | 4/2006 | Flynn et al. | |
| 2006/0085741 A1 | 4/2006 | Weiner | |
| 2006/0090122 A1 | 4/2006 | Pyhalammi et al. | |
| 2006/0112270 A1 | 5/2006 | Erez | |
| 2006/0130004 A1 | 6/2006 | Hughes et al. | |
| 2006/0149825 A1 | 7/2006 | Kim | |
| 2006/0161631 A1 | 7/2006 | Lira | |
| 2006/0200518 A1 * | 9/2006 | Sinclair | H04N 7/142 709/204 |
| 2006/0239275 A1 | 10/2006 | Zlateff et al. | |
| 2006/0239375 A1 | 10/2006 | Kim et al. | |
| 2006/0294386 A1 | 12/2006 | Yuval et al. | |
| 2007/0050778 A1 | 3/2007 | Lee | |
| 2007/0120846 A1 | 5/2007 | Ok et al. | |
| 2007/0130541 A1 | 6/2007 | Louch | |
| 2007/0158408 A1 | 7/2007 | Wang et al. | |
| 2007/0160198 A1 | 7/2007 | Orsini et al. | |
| 2007/0168614 A1 | 7/2007 | Jianjun et al. | |
| 2007/0245048 A1 | 10/2007 | Mezet et al. | |
| 2007/0271580 A1 | 11/2007 | Tischer et al. | |
| 2007/0273675 A1 | 11/2007 | Wangler | |

(56) References Cited

U.S. PATENT DOCUMENTS

| | | |
|---|---|---|
| 2007/0279852 A1 | 12/2007 | Daniel et al. |
| 2007/0282601 A1 | 12/2007 | Li |
| 2008/0024976 A1 | 1/2008 | Hardson et al. |
| 2008/0069358 A1 | 3/2008 | Yang |
| 2008/0080709 A1 | 4/2008 | Michtchenko et al. |
| 2008/0181141 A1 | 7/2008 | Krantz |
| 2008/0186305 A1* | 8/2008 | Carter .................. G06T 15/04 345/419 |
| 2008/0222238 A1 | 9/2008 | Ivanov et al. |
| 2008/0223890 A1 | 9/2008 | Tecchiolli et al. |
| 2008/0235629 A1* | 9/2008 | Porter ................. G06F 3/0481 715/849 |
| 2008/0241809 A1 | 10/2008 | Ashmore |
| 2008/0250179 A1 | 10/2008 | Moon |
| 2008/0305738 A1 | 12/2008 | Khedouri et al. |
| 2008/0313450 A1 | 12/2008 | Rosenberg |
| 2008/0317068 A1 | 12/2008 | Sagar |
| 2009/0089692 A1* | 4/2009 | Morris ................. G06F 3/0481 715/764 |
| 2009/0116445 A1 | 5/2009 | Samar et al. |
| 2009/0144653 A1 | 6/2009 | Ubillos |
| 2009/0146775 A1 | 6/2009 | Bonnaud et al. |
| 2009/0239468 A1 | 9/2009 | He |
| 2009/0240598 A1 | 12/2009 | Kargman |
| 2009/0300025 A1 | 12/2009 | Rothschild et al. |
| 2010/0001168 A1 | 1/2010 | Yong et al. |
| 2010/0020035 A1* | 1/2010 | Ryu ................. G06F 3/04883 345/173 |
| 2010/0050129 A1* | 2/2010 | Li ...................... G06F 3/0481 715/849 |
| 2010/0078343 A1 | 4/2010 | Hoellwarth |
| 2010/0088634 A1 | 4/2010 | Akira et al. |
| 2010/0093412 A1 | 4/2010 | Serra |
| 2010/0122207 A1 | 5/2010 | Kim et al. |
| 2010/0153449 A1* | 6/2010 | Baba .................... G06F 16/583 707/780 |
| 2010/0161743 A1 | 6/2010 | Krishnamurthi |
| 2010/0169639 A1 | 7/2010 | Jeffries |
| 2010/0169836 A1* | 7/2010 | Stallings ............. G06F 3/04817 715/848 |
| 2010/0225735 A1 | 9/2010 | Shaffer |
| 2010/0238089 A1 | 9/2010 | Massand |
| 2010/0256624 A1 | 10/2010 | Brannon |
| 2010/0268929 A1 | 10/2010 | Fumiyoshi |
| 2010/0281138 A1* | 11/2010 | Froimtchuk .......... G06F 9/5044 709/219 |
| 2010/0309228 A1 | 12/2010 | Mattos et al. |
| 2010/0313154 A1 | 12/2010 | Choi et al. |
| 2010/0315225 A1 | 12/2010 | Harrison et al. |
| 2010/0315417 A1 | 12/2010 | Cho et al. |
| 2011/0051642 A1 | 3/2011 | Krishnaswamy |
| 2011/0063211 A1 | 3/2011 | Hoerl et al. |
| 2011/0090534 A1 | 4/2011 | Terao et al. |
| 2011/0107269 A1 | 5/2011 | Chiu et al. |
| 2011/0113251 A1 | 5/2011 | Lu et al. |
| 2011/0131660 A1 | 6/2011 | Claessen et al. |
| 2011/0134110 A1 | 6/2011 | Song et al. |
| 2011/0138175 A1 | 6/2011 | Clark |
| 2011/0179368 A1 | 7/2011 | King et al. |
| 2011/0252098 A1* | 10/2011 | Kumar ................. G06Q 10/107 709/206 |
| 2011/0283208 A1* | 11/2011 | Gallo ................... G06F 9/4443 715/764 |
| 2011/0287808 A1 | 11/2011 | Huang |
| 2011/0294474 A1 | 12/2011 | Barany et al. |
| 2011/0295392 A1 | 12/2011 | Cunnington |
| 2011/0296339 A1 | 12/2011 | Kang |
| 2011/0310100 A1* | 12/2011 | Adimatyam ............ G06F 3/017 345/420 |
| 2012/0011200 A1 | 1/2012 | Zhang et al. |
| 2012/0034897 A1 | 2/2012 | Kreitzer |
| 2012/0047517 A1 | 2/2012 | Townsend et al. |
| 2012/0098754 A1* | 4/2012 | Kim .................... H04N 1/0035 345/173 |
| 2012/0128172 A1 | 5/2012 | Alden |
| 2012/0155510 A1 | 6/2012 | Hirsch et al. |
| 2012/0166953 A1 | 6/2012 | Affronti et al. |
| 2012/0194976 A1 | 8/2012 | Golko et al. |
| 2012/0200567 A1* | 8/2012 | Mandel ............ G06F 17/30994 345/420 |
| 2012/0209630 A1 | 8/2012 | Ihm et al. |
| 2012/0242845 A1 | 9/2012 | Tan |
| 2012/0260218 A1* | 10/2012 | Bawel ................. G06F 3/04815 715/841 |
| 2012/0267432 A1 | 10/2012 | Kuttuva |
| 2012/0282858 A1 | 11/2012 | Gill et al. |
| 2012/0293509 A1* | 11/2012 | Barnsley ................ G06T 9/00 345/419 |
| 2013/0028419 A1 | 1/2013 | Das et al. |
| 2013/0050117 A1* | 2/2013 | Cho ...................... G06F 3/0488 345/173 |
| 2013/0073692 A1 | 3/2013 | Isaza |
| 2013/0077529 A1 | 3/2013 | Lueckenhoff et al. |
| 2013/0080541 A1 | 3/2013 | Herbert |
| 2013/0097239 A1 | 4/2013 | Brown et al. |
| 2013/0111038 A1 | 5/2013 | Girard |
| 2013/0125000 A1 | 5/2013 | Fleischhauer |
| 2013/0152113 A1 | 6/2013 | Conrad et al. |
| 2013/0159080 A1 | 6/2013 | Wu et al. |
| 2013/0159178 A1 | 6/2013 | Colon et al. |
| 2013/0163195 A1 | 6/2013 | Pelletier |
| 2013/0201176 A1 | 8/2013 | Lee |
| 2013/0205277 A1 | 8/2013 | Seven et al. |
| 2013/0212112 A1 | 8/2013 | Blom |
| 2013/0219479 A1 | 8/2013 | Desoto et al. |
| 2013/0227420 A1 | 8/2013 | Pasquero et al. |
| 2013/0235037 A1* | 9/2013 | Baldwin ................ G06F 21/00 345/420 |
| 2013/0238711 A1 | 9/2013 | Lashkari et al. |
| 2013/0256403 A1 | 10/2013 | Mackinnon |
| 2013/0260819 A1 | 10/2013 | Suzuki et al. |
| 2013/0266065 A1 | 10/2013 | Paczkowski |
| 2013/0266129 A1 | 10/2013 | Pattan et al. |
| 2013/0268802 A1 | 10/2013 | Ito et al. |
| 2013/0272196 A1 | 10/2013 | Li |
| 2013/0273983 A1 | 10/2013 | Hsu |
| 2013/0290440 A1 | 10/2013 | Pratt et al. |
| 2013/0300740 A1 | 11/2013 | Snyder |
| 2013/0303160 A1 | 11/2013 | Fong |
| 2013/0317835 A1 | 11/2013 | Matthew |
| 2013/0346911 A1* | 12/2013 | Sripada ................. G06F 3/0488 715/782 |
| 2014/0012913 A1 | 1/2014 | Varoglu et al. |
| 2014/0026204 A1 | 1/2014 | Buntinx et al. |
| 2014/0039804 A1 | 2/2014 | Park et al. |
| 2014/0040777 A1* | 2/2014 | Jones ..................... H04L 65/403 715/753 |
| 2014/0052522 A1 | 2/2014 | Irani et al. |
| 2014/0052618 A1 | 2/2014 | Drozd et al. |
| 2014/0055822 A1* | 2/2014 | Hannaway ............... G06F 17/50 358/3.28 |
| 2014/0078136 A1 | 3/2014 | Sohn |
| 2014/0082547 A1* | 3/2014 | Ding .................... G06F 3/0488 715/778 |
| 2014/0106677 A1 | 4/2014 | Altman |
| 2014/0123033 A1 | 5/2014 | Uhma et al. |
| 2014/0132594 A1 | 5/2014 | Gharpure |
| 2014/0132736 A1 | 5/2014 | Chang |
| 2014/0136429 A1 | 5/2014 | Psihos |
| 2014/0141713 A1 | 5/2014 | Shirinfar |
| 2014/0156725 A1 | 6/2014 | Mandyam |
| 2014/0189532 A1 | 7/2014 | Sivaraman et al. |
| 2014/0207657 A1 | 7/2014 | Gacs et al. |
| 2014/0218356 A1* | 8/2014 | Distler ................... G06T 19/20 345/419 |
| 2014/0232817 A1* | 8/2014 | Jones .................... H04M 3/568 348/14.08 |
| 2014/0258938 A1* | 9/2014 | Christmas ........... G06F 3/04815 715/849 |
| 2014/0337640 A1 | 11/2014 | Sharma |
| 2014/0351181 A1 | 11/2014 | Canoy et al. |
| 2014/0355761 A1 | 12/2014 | Kawamura et al. |

(56) References Cited

U.S. PATENT DOCUMENTS

| | | |
|---|---|---|
| 2015/0009531 A1 | 1/2015 | Kawaguchi |
| 2015/0012617 A1 | 1/2015 | Park et al. |
| 2015/0019628 A1 | 1/2015 | Li |
| 2015/0019983 A1* | 1/2015 | White .................. G06F 3/04817 715/739 |
| 2015/0095777 A1 | 4/2015 | Lim |
| 2015/0101018 A1 | 4/2015 | Forte |
| 2015/0106837 A1 | 4/2015 | Li |
| 2015/0145889 A1 | 5/2015 | Hanai |
| 2015/0160824 A1* | 6/2015 | White .................. G06F 3/04815 715/849 |
| 2015/0194833 A1 | 7/2015 | Fathollahi et al. |
| 2015/0271271 A1 | 9/2015 | Bullota |
| 2015/0271299 A1 | 9/2015 | Bullota |
| 2015/0279470 A1 | 10/2015 | Cerrelli et al. |
| 2015/0281439 A1 | 10/2015 | Dudai |
| 2015/0339867 A1 | 11/2015 | Amon |
| 2015/0367230 A1* | 12/2015 | Bradford .................. G06F 21/31 463/9 |
| 2015/0382169 A1 | 12/2015 | Burba |
| 2016/0014574 A1 | 1/2016 | Christmas et al. |
| 2016/0100279 A1 | 4/2016 | Christmas et al. |
| 2016/0134941 A1 | 5/2016 | Selvaraj |
| 2016/0162244 A1* | 6/2016 | Christmas ............... G06T 15/00 345/1.3 |
| 2016/0188468 A1 | 6/2016 | Rao |
| 2016/0226730 A1 | 8/2016 | Schumacher |
| 2016/0260319 A1 | 9/2016 | Jeffery |
| 2016/0269468 A1 | 9/2016 | Malpass |
| 2017/0160992 A1 | 6/2017 | Christmas |
| 2017/0300214 A1* | 10/2017 | Roundtree .............. H04L 67/02 |
| 2017/0371378 A1 | 12/2017 | Christmas |
| 2018/0146378 A1 | 5/2018 | Christmas |
| 2018/0253427 A1* | 9/2018 | Krishnan ................ G06F 16/93 |
| 2019/0007477 A1 | 1/2019 | Malpass |
| 2019/0012473 A1 | 1/2019 | Christmas et al. |
| 2019/0020576 A1 | 1/2019 | Christmas et al. |
| 2019/0037381 A1 | 1/2019 | Christmas et al. |
| 2019/0123501 A1 | 4/2019 | Christmas |

FOREIGN PATENT DOCUMENTS

| | | |
|---|---|---|
| CN | 1881164 | 12/2006 |
| CN | 101388815 | 3/2009 |
| CN | 101401341 | 4/2009 |
| CN | 102376133 | 3/2012 |
| CN | 102591571 A | 7/2012 |
| CN | 103077462 | 5/2013 |
| CN | 103095852 | 5/2013 |
| CN | 103546181 A | 1/2014 |
| CN | 106797337 | 5/2018 |
| CN | 105706033 | 5/2019 |
| EP | 0800144 | 10/1997 |
| EP | 1168769 A2 | 2/2002 |
| EP | 1761048 A2 | 3/2007 |
| EP | 1806649 A1 | 7/2007 |
| EP | 3022638 | 4/2018 |
| HK | 1242492 | 6/2018 |
| JP | 09-091155 | 4/1997 |
| JP | 2007-049606 | 2/2007 |
| JP | 2010-535351 | 11/2010 |
| JP | 2011-134159 | 7/2011 |
| JP | 2011-147136 | 7/2011 |
| JP | 2011-248489 | 12/2011 |
| JP | 6310477 | 4/2018 |
| JP | 2015514845 | 6/2018 |
| JP | 6479026 | 2/2019 |
| KR | 10-2004-0108122 | 12/2004 |
| KR | 10-2005-0098078 | 10/2005 |
| KR | 1020090059672 | 6/2009 |
| KR | 10-2010-0056594 A | 5/2010 |
| KR | 10-2012-0092487 A | 8/2012 |
| KR | 10-2012-0059488 | 5/2013 |
| KR | 10-2017-0047866 | 5/2017 |
| RU | 2421800 | 6/2011 |
| TW | 201214150 | 4/2012 |
| TW | 201320681 | 5/2013 |
| TW | 201349811 | 12/2013 |
| TW | 629910 | 7/2018 |
| WO | 2000033545 | 6/2000 |
| WO | WO 2005050393 | 6/2005 |
| WO | WO 2006107324 | 10/2006 |
| WO | WO 2006125027 | 11/2006 |
| WO | 2007-076494 A2 | 7/2007 |
| WO | WO 2007103908 A2 | 9/2007 |
| WO | 2008090902 | 7/2008 |
| WO | WO 2009016612 | 2/2009 |
| WO | 2010018551 | 8/2010 |
| WO | 2012-087847 A2 | 6/2012 |
| WO | 2014012486 | 1/2014 |
| WO | WO 2014016622 | 1/2014 |
| WO | 2014085502 | 6/2014 |
| WO | 2014138187 | 9/2014 |
| WO | 2014141235 | 9/2014 |
| WO | 2014151925 A1 | 9/2014 |
| WO | 2015009944 | 1/2015 |
| WO | 2015048684 | 4/2015 |
| WO | 2015112506 | 7/2015 |
| WO | 2016007780 | 1/2016 |
| WO | 2016057091 | 4/2016 |
| WO | 2016145126 | 9/2016 |
| WO | 2017096245 | 6/2017 |
| WO | 2018098313 | 5/2018 |
| WO | 2018144833 | 8/2018 |
| WO | 2018232186 | 12/2018 |
| WO | 2019079628 | 4/2019 |

OTHER PUBLICATIONS

Sweden; Office Action dated Nov. 18, 2015 in Application Serial No. 1551071-2.
3rd party observation dated Dec. 22, 2015 against Patent Application No. 1551071-2 in Sweden.
Revault Product Data Sheet dated Mar. 19, 2015.
PCT; International Search Report and Written Opinion dated Jul. 11, 2016 in US2016/021627.
USPTO; Notice of Allowance dated Aug. 16, 2016 in U.S. Appl. No. 14/092,165.
Kim, Young-Gon, and Moon-Seog Jun. A design of user authentication system using QR oode identifying method. Computer Sciences and Convergence Information Technology (ICCIT), 6th International Conference on IEEE. Nov. 29-Dec. 1, 2011.
Application Programming Interface by David Orenstein, published Jan. 10, 2000 on Computerworld.com.
Gerd Kortuem et al., 'Architectural Issues in Supporting Ad-hoc Collaboration with Wearable Computers,' In: Proceedings of the Workshop on Software Engineering for Wearable and Pervasive Computing at the 22nd International Conference on Software Engineering, 2000.
USPO; Office Action dated Oct. 8, 2015 in U.S. Appl. No. 14/092,165.
USPTO; Office Action dated Sep. 18, 2015 in U.S. Appl. No. 14/164,919.
PCT; International Preliminary Report on Patentability dated Sep. 8, 2015 in Application No. US2014/020624.
PCT; International Search Report dated Nov. 13, 2014 in US2014/047054.
PCT; Written Opinion dated Nov. 13, 2014 in US2014/047054.
PCT; International Search Report dated Jan. 6, 2015 in US2014/058126.
PCT; Written Opinion dated Jan. 6, 2015 in US2014/058126.
PCT; International Preliminary Report on Patentability dated Jun. 2, 2015 in US2013072089.
PCT; International Search Report dated Apr. 24, 2015 in US2015/012063.
PCT; Written Opinion dated Apr. 24, 2015 in US2015/012063.
PCT; International Search Report dated Oct. 6, 2015 in US2015/036801.
PCT International Search Report and Written Opinion dated Mar. 5, 2014 in Application No. PCT/US2013/072089.

(56) References Cited

OTHER PUBLICATIONS

PCT International Search Report and Written Opinion dated Jul. 4, 2014 in Application No. PCTUS2014/020624.
USPTO; Office Action dated Apr. 5, 2016 in U.S. Appl. No. 14/500,363.
USPTO; Final Office Action dated Jun. 3, 2016 in U.S. Appl. No. 14/092,165.
USPTO; Final Office Action dated Apr. 26, 2016 in U.S. Appl. No. 14/164,919.
USPTO; Office Action dated Jun. 22, 2016 in U.S. Appl. No. 14/745,100.
USPTO; Office action dated Apr. 22, 2016 in U.S. Appl. No. 14/709,231.
PCT; International Preliminary Report on Patentability dated Apr. 14, 2016 in US2014/058126.
EP; Supplemental Search Report dated Jun. 14, 2016 in Application Serial No. 13859205.0.
PCT; International Search Report and Written Opinion dated Nov. 2, 2015 in US2015/039797.
EP; Extended Search Report dated Mar. 21, 2017 in Application Serial No. 14846886.1.
USPTO; Office Action dated Apr. 7, 2017 in U.S. Appl. No. 14/500,363.
USPTO; Office Action dated Apr. 14, 2017 in U.S. Appl. No. 14/905,639.
USPTO; Office Action dated Apr. 6, 2017 in U.S. Appl. No. 14/709,231.
USPTO; Office Action dated May 4, 2017 in U.S. Appl. No. 14/745,100.
MX; Examination Report dated Feb. 24, 2017 in Application Serial No. 2015/006550.
PCT; International Search Report and Written Opinion dated Mar. 20, 2017 in US2016/064744.
USPTO; Final Office Action dated Oct. 26, 2016 in U.S. Appl. No. 14/500,363.
USPTO; Final Office Action dated Oct. 11, 2016 in U.S. Appl. No. 14/709,231.
USPTO; Notice of Allowance dated Oct. 14, 2016 in U.S. Appl. No. 14/164,919.
USPTO; Final Office Action dated Dec. 20, 2016 in U.S. Appl. No. 14/745,100.
USPTO; Office Action dated Nov. 25, 2016 in U.S. Appl. No. 14/795,210.
EP; Supplemental Search Report dated Oct. 20, 2016 in Application Serial No. 14760041.5.
EP; Extended Search Report dated Jan. 24, 2017 in Application Serial No. 14760041.5.
EP; Supplemental Search Report dated Mar. 2, 2017 in Application Serial No. 14826056.5.
USPTO; Final Office Action dated Aug. 17, 2017 in U.S. Appl. No. 14/795,210.
USPTO; Notice of Allowance dated Oct. 11, 2017 in U.S. Appl. No. 14/905,639.
USPTO; Final Office Action dated Sep. 25, 2017 in U.S. Appl. No. 14/500,363.
USPTO; Final Office action dated Sep. 29, 2017 in U.S. Appl. No. 14/709,231.
USPTO; Office Action dated Oct. 25, 2017 in U.S. Appl. No. 15/435,884.
USPTO; Final Office Action dated Oct. 13, 2017 in U.S. Appl. No. 14/745,100.
MX; Examination Report dated Apr. 21, 2017 in Application Serial No. 2015/011314.
JP; Examination Report dated Jul. 28, 2017 in Application Serial No. 2015-545200.
CN; Examination Report dated Jul. 28, 2017 in Application Serial No. 20138007041.5X.
MX; 2nd Examination Report dated Oct. 24, 2017 in Application Serial No. 2015/011314.
EP; Supplemental Search Report dated Sep. 15, 2017 in Application Serial No. 15740208.2.
Sue White: Wi-Fi and Bluetooth Coexistence, Electronic Compnent News, Mar. 2, 2012, pp. 1-7, XP05504386, Retrieved from Internet: URL:https://www.ecnmag.com/article/2012/03/wi-fi-andbluetooth-coexistence [retrieved on Sep. 6, 2017].
USPTO; Notice of Allowance dated May 7, 2018 in U.S. Appl. No. 15/065,713.
USPTO; Notice of Allowance dated May 17, 2018 in U.S. Appl. No. 14/709,231.
USPTO; Non-Final Office Action dated May 18, 2018 in U.S. Appl. No. 15/644,556.
USPTO; Notice of Allowance dated May 22, 2018 in U.S. Appl. No. 15/435,884.
USPTO; Notice of Allowance dated May 29, 2018 in U.S. Appl. No. 15/065,713.
USPTO; Notice of Allowance dated Jun. 20, 2018 in U.S. Appl. No. 15/435,884.
USPTO; Non-Final Office Action dated Jun. 28, 2018 in U.S. Appl. No. 14/795,210.
USPTO; Notice of Allowance dated Jun. 29, 2018 in U.S. Appl. No. 15/065,713.
USPTO; Notice of Allowance dated Jul. 5, 2018 in U.S. Appl. No. 14/745,100.
EP; Supplemental Search Report dated Aug. 21, 2017 in Application Serial No. 14760041.5.
CN; 2nd Examination Report dated Apr. 18, 2018 in Application Serial No. 201380070415.X.
CN; Examination Report dated May 9, 2018 in Application Serial No. 201480023946.8.
TW; Notice of Allowance dated May 15, 2018 in Application Serial No. 104102514.
AU; 1st Office Action dated Apr. 13, 2018 in Application Serial No. 2013352236.
PCT; International Search Report and Written Opinion dated Feb. 20, 2018 in US/2017/063061.
USPTO; Notice of Allowance dated Nov. 29, 2017 in U.S. Appl. No. 14/905,639.
USPTO; Non-Final Office Action dated Dec. 12, 2017 in U.S. Appl. No. 15/367,961.
USPTO; Non-Final Office Action dated Jan. 8, 2018 in U.S. Appl. No. 15/065,713.
USPTO; Notice of Allowance dated Feb. 26, 2018 in U.S. Appl. No. 14/745,100.
EP; Extended Search Report dated Sep. 17, 2015 in Application Serial No. 15740208.2.
MX; Office Action dated Jan. 23, 2018 in Application Serial No. MX/a/2016/003798.
TW; Office Action dated Jan. 24, 2018 in Application Serial No. 104102514.
EP; Extended Search Report dated Apr. 9, 2018 in Application Serial No. 15848371.9.
EP; Extended Search Report dated Apr. 24, 2018 in Application Serial No. 15819468.8.
JP; Office Action dated Aug. 2, 2017 in Application Serial No. 2015-545200.
JP; Office Action dated Feb. 2, 2018 in Application Serial No. 2016-549317.
USPTO; Non-Final Office Action dated Feb. 6, 2019 in U.S. Appl. No. 15/644,556.
USPTO; Final Office Action dated Feb. 7, 2019 in U.S. Appl. No. 14/795,210.
USPTO; Non-Final Office Action dated Mar. 7, 2019 in U.S. Appl. No. 15/367,961.
CN; 1st Office Action dated Nov. 26, 2018 in Application Serial No. 201480065117.6.
CN; Notice of Intent to Grant dated Feb. 11, 2019 in Application No. CN 201380070415.
EP; Notice of Intent to Grant dated Jan. 4, 2019 in Application No. EP14760041.5.
CN; Notice of Intent to Grant dated Jan. 30, 2019 in Application No. CN 201480023946.8.

(56) References Cited

OTHER PUBLICATIONS

EP; Examination Report dated Feb. 5, 2019 in Application No. EP 13859205.0.
JP; Notice of Allowance dated Dec. 30, 2018 in Application No. JP 2016-549317.
TW; Search Report dated Dec. 10, 2018 in Application No. TW 107119353.
TW; First Office Action dated Dec. 6, 2018 in Application No. TW 107119353.
EP; Examination Report dated Jan. 3, 2019 in Application No. EP 15848371.9.
PCT; International Search Report and Written Opinion dated Oct. 12, 2018 in International Application PCT/US2018/037643.
Rico Fabio et al., "A Testbed for Developing, Simulating and Experimenting Multipath Aggregation Algorithms," Proceedings of the 2014 IEEE Emerging Technology and Factory Automation (ETFA), IEEE, pp. 1-4, (Sep. 2014).
USPTO; Notice of Allowance dated Jul. 10, 2018 in U.S. Appl. No. 14/709,231.
USPTO; Final Office Action dated Aug. 10, 2018 in U.S. Appl. No. 15/367,961.
USPTO; Notice of Allowance dated Sep. 28, 2018 in U.S. Appl. No. 15/644,556.
MX; 3rd Examination Report dated Jul. 2, 2018 in Application No. 2015/011314.
EP; Supplementary Search Report dated Apr. 30, 2018 in Application Serial No. 15848371.9.
JP; Notice of Allowance dated Mar. 17, 2018 in Application Serial No. 2015-545200.
PCT; International Preliminary Report on Patentability dated Jan. 19, 2016 in US2014/047054.
PCT; International Search Report and Written Opinion dated Aug. 9, 2018 in International Application PCT/US2018/016610.
CN; 1st Office Action dated Nov. 20, 2018 in Application Serial No. 201580016416.5.
EP; Extended Search Report and Supplementary Search Report dated Oct. 19, 2018 in Application Serial No. 16762464.2.
AU; 1st Office Action dated Oct. 24, 2018 in Application Serial No. 2015287705.
MX; 2nd Examination Report dated Oct. 4, 2018 (Received from Mexico counsel on Nov. 6, 2018) in Application Serial No. MX/a/2016/003798.
CN; 3rd Examination Report dated Oct. 31, 2018 in Application Serial No. CN 201380070415.
EPO; Examination Report dated Nov. 8, 2018 in Application No. EP 15740208.2.
AU; Examination Report dated Dec. 19, 2018 in Application Serial No. AU 2014225864.
"Class Persistent Manager," https://web.archive.org/web/20131110042918/https://tomcat.apache.org/tomcat-4.1-doc/catalina/docs/api/org/apache/catalina/session, 3 Pages, (Oct. 2018).

UAE; First Examination Report dated Nov. 19, 2019 in Application No. UAE/P/0698/2015.
UAE; Korean Search Report cited in First Examination Report dated Nov. 19, 2019 in Application No. UAE/ P/0698/2015.
USPTO; Notice of Allowance dated May 21, 2019 in U.S. Appl. No. 15/644,556.
USPTO; Non-Final Office Action dated May 30, 2019 in U.S. Appl. No. 16/114,531.
USPTO; Restriction Requirement dated Jun. 20, 2019 in U.S. Appl. No. 16/152,342.
USPTO; Non-Final Office Action dated Sep. 30, 2019 in U.S. Appl. No. 16/152,342.
USPTO; Notice of Allowance dated Aug. 28, 2019 in the U.S. Appl. No. 15/821,212.
USPTO; Restriction Requirement dated Jun. 11, 2019 in the U.S. Appl. No. 16/164,468.
AU; 2nd Examination Report Mar. 20, 2019 in Application No. AU 2014225864.
MX; 3rd Examination Report dated Mar. 21, 2019 in Application No. MX/a/2016/003798.
CA; Office Action dated Nov. 23, 2018 in Application No. CA 2892664.
CA; 2nd Office Action dated Feb. 14, 2019 in Application No. CA 2892664.
AU; Examination Report dated Feb. 8, 2019 in Application No. AU 2015328723.
RU; Examination Report dated Jan. 31, 2019 in Application No. RU 2017113541.
EP; Examination Report dated Apr. 18, 2019 in Application No. EP 15819468.8.
JP; Examination Report dated May 8, 2019 in Application No. 2017-518492.
MX; Examination Report dated Jun. 19, 2019 in Application No. MX/a/2017/004463.
MX; Examination Report dated May 27, 2019 in Application No. MX/a/2016/000616.
Sweden; Office Action dated Jul. 17, 2019 in Application No. 1551071-2.
CN; Second Office Action dated Apr. 29, 2019 in Application No. 201480065117.6.
CN; Third Office Action dated Aug. 8, 2019 in Application No. 201480065117.6.
PCT; International Search Report and Written Opinion dated Feb. 12, 2019 in International Application PCT/US2019/056562.
PCT; International Preliminary Report on Patentability dated Jan. 19, 2017 in the International Application No. PCT/US2015/039797.
PCT; International Preliminary Report on Patentability dated Aug. 15, 2019 in the International Application No. PCT/US2018/016610.
PCT; International Search Report and Written Opinion dated Mar. 22, 2019 in the International Application No. PCT/US2018/063468.
PCT; International Search Report and Written Opinion dated Aug. 9, 2019 in the International Application No. PCT/US2019/027993.

\* cited by examiner

SYSTEM AND METHOD FOR CUBIC GRAPHICAL USER INTERFACES

CROSS-REFERENCE TO RELATED APPLICATIONS

This application claims priority to U.S. Provisional Application Ser. No. 61/773,003 entitled "System and Method for Cubic Graphical User Interfaces" and filed on Mar. 5, 2013, which is incorporated herein by reference in its entirety.

FIELD

The present disclosure generally relates to graphical user interfaces ("GUI"), and more particularly to cubic GUIs.

BACKGROUND

Graphical User Interfaces allow users to view and manipulate data on a screen. Data is typically displayed two dimensionally. The limited space on a screen limits the amount of data that can be displayed on a single screen. Moreover, users must often open multiple windows and layers of applications in order to use several different applications. Additionally, typical GUIs limit the communication between various applications.

Additionally, multiple users of a computer or program may desire different content and appearances for the system. Switching users may require a restart of a computer, or otherwise take time for new profile to load. Faster, more user friendly systems for changing profiles may be desired.

Furthermore, users often transmit multiple files between each other as attachments to a communication such as an email or message. However, it can be time consuming to individually attach each file to the message, as well as to download each file separately. Zip files are one method of transmitting multiple files. However, these files do not allow recipients to easily view the contents of the zip file and decide which files to download.

SUMMARY

The present disclosure includes a system, method and computer program product for using cubes as three dimensional graphical user interfaces ("GUI"). In various embodiments, a cube may comprise a container on each cube face. One or more files or applications may be loaded into each container. The cube may be rotated to display a selected cube face. The cube configuration may be saved, such that the files or applications on each cube face are saved on the cube.

In various embodiments, systems, methods and computer program products for changing profiles using a cube are disclosed. A profile cube may comprise a user profile on one or more cube faces. A first cube face may comprise a first user profile and a second cube face may comprise a second user profile. The different user profiles may correspond to different users. However, in various embodiments, the different user profiles may correspond to different profiles for the same user. In response to the profile cube being rotated from the first cube face to the second cube face, at least one of the content and display of the screen may change to settings associated with the second user profile. The user profiles may include sub-profile cubes which allow users to further specify settings for multiple profiles of the same user.

In various embodiments, systems, methods and computer program products for transmitting files using a cube are disclosed. A cube may be created. Each cube face may be associated with a file or application. The cube may be compressed and transmitted to a recipient. The compressed cube may be transmitted as an email attachment. The recipient may request to resize the cube, and uncompressed data may be transmitted to the recipient in order to display the resized cube.

In various embodiments, systems, methods and computer program products for analyzing data using a cube are disclosed. Graphical data may be associated with multiple cube faces of an analytic cube. The data may be merged such that data lines extend through the cube in three dimensions. The three dimensional data may assist in determining a relationship between the data. A target goal may be created within the analytic cube. A data line may be moved to intersect with the target goal. The analytic cube may determine requirements in order to meet the target goal.

In various embodiments, graphical user interface systems, methods, and computer program products are disclosed. A method may include generating a two-dimensional representation of a three-dimensional object. The method may include associating first data with a first face of the three-dimensional object. The method may include associating second data with a second face of the three-dimensional object.

In various embodiments, a method may include generating a graphical representation of a cube. The method may include storing a first file on a first face of the cube, and storing a second file on a second face of the cube. The method may include displaying the first face of the cube. The method may include rotating the cube in response to user input. The method may include displaying the second file in response to the rotating.

BRIEF DESCRIPTION OF THE DRAWINGS

A more complete understanding may be derived by referring to the detailed description and claims when considered in connection with the Figures, wherein like reference numbers refer to similar elements throughout the Figures, and:

DETAILED DESCRIPTION

Figure 1:
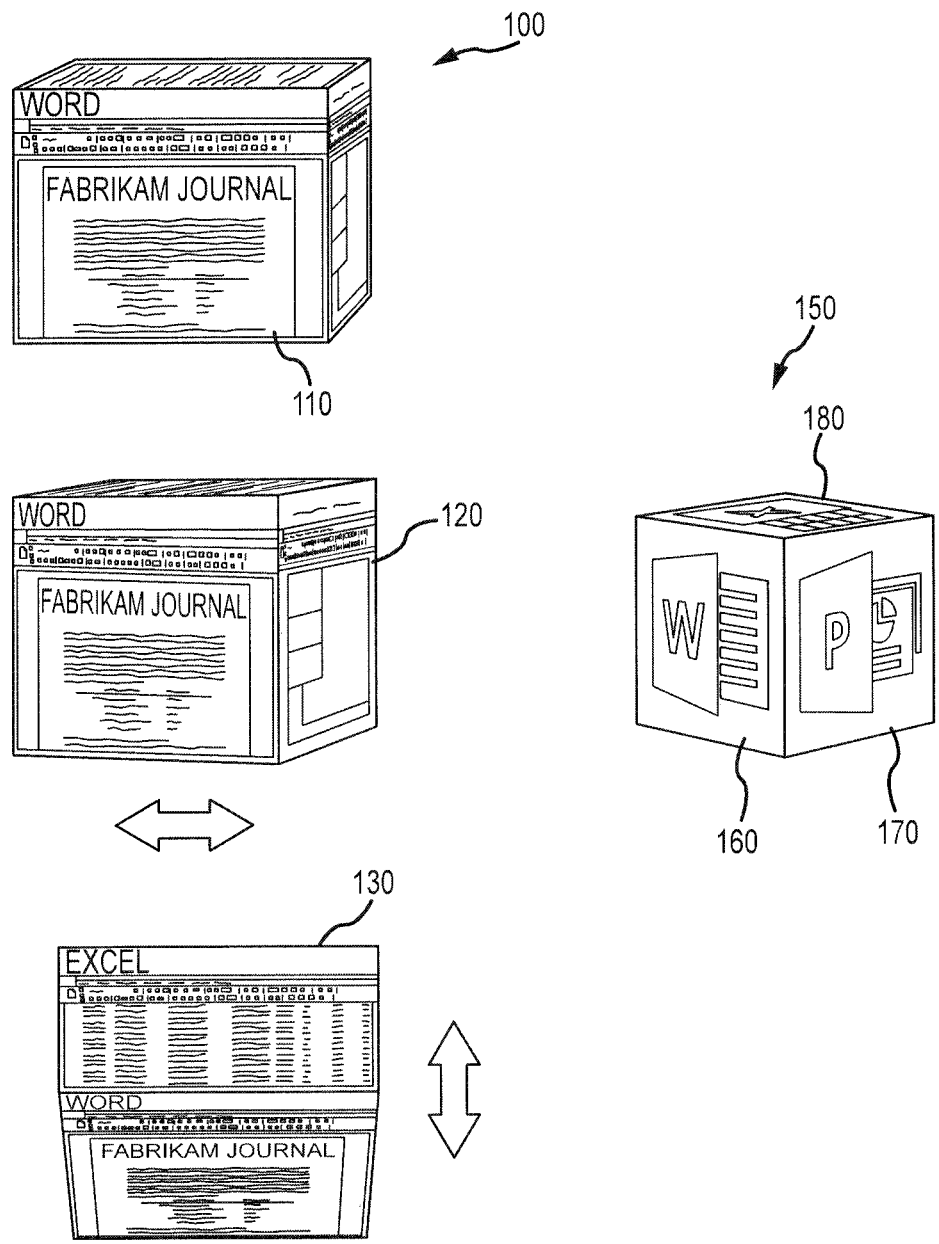
FIG. 1 illustrates a cube according to various embodiments of the disclosure.

The detailed description of exemplary embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Systems, methods and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement the disclosure in alternative embodiments.

Graphical User Interfaces ("GUI") including cubes are disclosed according to various embodiments. Although described herein with reference to cubes, the present disclosure is compatible with any shape of objects, such as tetrahedrons and decahedrons. In various embodiments, a cube may be presented to a user. The cube may be a two-dimensional graphical representation of a three-dimensional cube. However, in various embodiments, three-dimensional cubes may be used with three-dimensional displays.

In various embodiments, the user may rotate the cube. The user may click on and drag the cube such that it rotates. In various embodiments, in response to the user clicking on an edge of the cube, the cube may rotate such that a cube face adjacent to the edge is rotated to the front of the display. In various embodiments, the cube faces are transparent or semi-transparent, such that all cube faces are displayed simultaneously. In various embodiments, the cube faces may become transparent or semi-transparent in response to a user moving a mouse to a specified location, such as a specified distance from an edge of the cube. The cube may further comprise a key or legend which displays what is located on each cube face. Thus, the user may select an item in the key and the cube may rotate such that the cube face corresponding to the selected item is rotated to the front of the cube. The user may select any of the cube faces by clicking on a cube face, and the cube may rotate such that the selected cube face is moved to the front.

In various embodiments, the cube may maintain the orientation of the content on a cube face relative to that cube face. In response to a user selecting a cube face adjacent to a currently displayed cube face, the cube may perform a first rotation of ninety degrees in a first direction in order to display the selected cube face. However, if the content of the selected cube face is not oriented correctly (e.g. upside down or sideways), the cube may also perform a second rotation of ninety or one hundred eighty degrees in a second direction in order to orient the content of the selected face correctly. In various embodiments, the first rotation and the second rotation may be performed simultaneously.

In various embodiments, the cube may rotate to display the selected cube face, and the content of the selected cube face may be rotated to the correct orientation without rotating any other portion of the cube. Thus, only one rotation of the entire cube may be required, and the content may still be displayed correctly.

Each cube face may comprise a container capable of holding one or more files. The user may add a file to a cube face by dragging and dropping a file onto the cube face. In various embodiments, the user may load a file onto the cube face by browsing through files and selecting a file to be loaded onto the cube face. In various embodiments, the cube and/or the cube face is not limited to a particular application. Thus, the user may select any type of file or application and load it onto the cube face. Furthermore, the user may load different application files to each cube face. For example, a user may load a text file on a first cube face, and a web browser on a second cube face.

In various embodiments, each cube face may comprise a single file or application. However, in various embodiments, each cube face may comprise a plurality of files and/or applications. Furthermore, in various embodiments, a cube face may comprise one or more smaller, second level cubes. Each second level cube may comprise one or more files or applications on each cube face of the second level cube. Second level cubes may comprise third level cubes, etc. In various embodiments, the multiple levels of cubes may be organized similar to a folder structure or a drill-down menu.

In various embodiments, the user may save cube configurations. The user may load particular files on the cube faces, and save the cube configuration. The user may open the saved cube configuration at a later time, and the cube configuration may open with all of the files saved on the cube faces. Furthermore, the cube may load dynamically, such that if a user has updated one of the files by working on the file individually in its native application, the file may automatically update on the saved cube. In various embodiments, cube configurations comprising a plurality of applications may be saved. For example, a user may save a cube with a text editor on a first cube face, a web browser on a second cube face, and a multimedia player on a third face.

In various embodiments, cube configurations may be sold as software bundles. Software developers may determine that certain programs are often used in combination with each other, and may package such software together on a cube. The software manufacturer may be able to provide discounts to the consumer by selling multiple applications together. Additionally, certain software programs require a networking effect in order to become popular, and by bundling software which requires a networking effect on a cube with already popular software, developers may increase the speed of distribution of new programs.

In various embodiments, users may create custom cube configurations which can be sold user-to-user. The cube software developer may take a royalty from user-to-user sales. Thus, the cube software developer may be able to encourage users to create more useful or otherwise desirable cube configurations and profit from the creations.

The cube may comprise an active face which is visible on a display. In read-only situations, the user may view whatever information is on the active cube face. The user may resize the cube and perform operations typically associated with read-only documents. In various embodiments, a user may save a cube configuration as read-only. The cube may be saved in a common format, such as .pdf or .jpg. Thus, the read-only cube may be viewed on systems which are not capable of running various software applications which were used to create the files on the cube faces. For example, a first user may create a cube comprising .doc files and save the cube as read-only. A second user may download the cube. However, the second user's system may not be capable of displaying .doc files. The cube may convert the files to .jpg so that the second user may view the files on the cube. In various embodiments, the cube may comprise partial applications that allow the second user to view the files in their native format on the cube without requiring the second user's system to be capable of displaying .doc files.

In various embodiments, a plurality of cubes may be present on a screen. The plurality of cubes may interact with each other, and/or be separately functioning cubes. In various embodiments, each cube may exist in its own plane. Thus, one or more cubes may overlap without affecting the functionality of each other. In various embodiments, a plurality of cubes may exist in each plane.

Referring to FIG. 1, a plurality of cubes are illustrated according to various embodiments. Cube 100 comprises a text document on a first cube face 110, a slide show document on a second cube face 120, and a spreadsheet document on a third face 130. As illustrated by the arrows, cube 100 may be rotated to display the different cube faces.

Cube 150 may comprise a software bundle. Cube 150 may comprise a text editor application on a first cube face 160, a slide show application on a second face 170, and a spreadsheet application on a third face 180. In various embodiments, a user may create cube 100 by dragging and dropping files onto cube 150. However, in various embodiments, a user may open files from within the cube faces of cube 150. In various embodiments, a user may change which applications correspond to the various cube faces of cube 150.

In various embodiments, a display profile may be selected based on an active face of a profile cube. The profile cube may comprise a variety of profiles. In various embodiments, the profiles may be associated with a specific user. For example, a first cube face may be associated with a first user, and a second cube face may be associated with a second user. Each user may fully customize the display and content of their associated profile.

For example, the first user profile may comprise icons and applications which the first user has selected. Additionally, each user may have several sub-profiles which are associated with the user. The sub-profiles may be selected from a separate sub-profile cube from the profile cube. In various embodiments, the sub-profile cube may be embedded within the profile cube. In response to a profile being selected from the profile cube, the sub-profile cube associated with the profile may be displayed. The sub-profile cube may allow the user to select various sub-profiles. For example, in various embodiments, the first user's sub-profiles may be associated with different subjects in school, such as Math, English, and History.

In response to a sub-profile being selected, the displayed content may change to content associated with the sub-profile. In various embodiments, in response to the Math sub-profile being selected, math related cubes, folders, files, and/or applications may be displayed to the user. In various embodiments, a Math cube associated with the Math sub-profile may be displayed. The Math cube may comprise applications and documents often used by the user while in the Math sub-profile. For example, a first cube face may comprise a web browser connected to a homepage for a math class, and a second cube face may comprise a calculator application. One skilled in the art will recognize that any documents or applications may be compatible with the present disclosure.

In various embodiments, the layout of a desktop or dashboard may be based on the active profile. Various icons on a desktop may change based on the active profile. Additionally, settings such as colors, themes, icon sizes, etc. may be saved in association with particular profiles. In various embodiments, the profile cube may fill the entire display of a screen. However, in various embodiments the user may minimize the profile cube, and the profile cube may be displayed in a task bar or other location on the screen.

Figure 2:
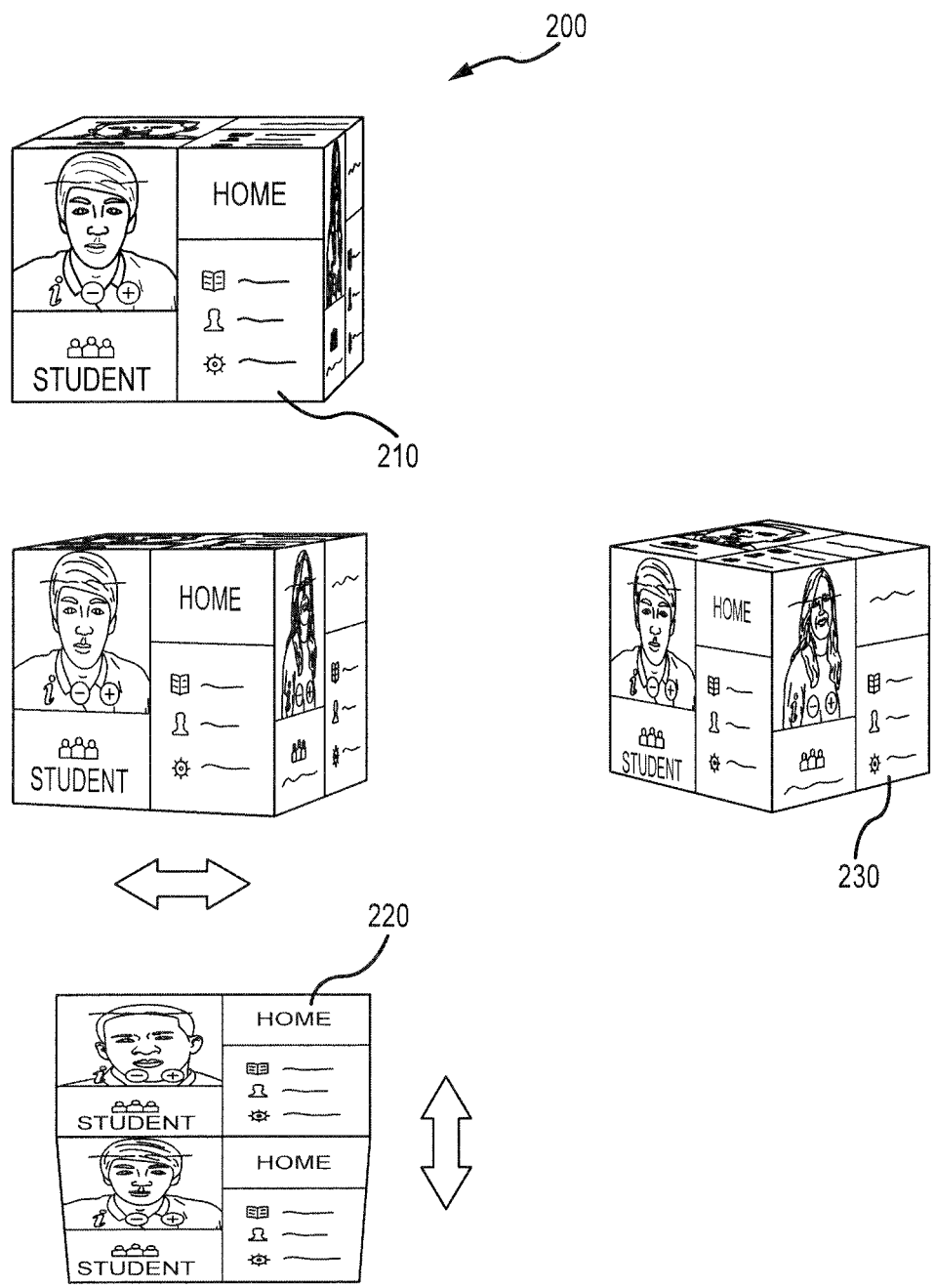
FIG. 2 illustrates a profile cube according to various embodiments.

Referring to FIG. 2, various views of a profile cube 200 are illustrated according to various embodiments. Profile cube 200 may comprise a profile for a first user on a first cube face 210. Profile cube 200 may further comprise a profile for a second user on a second cube face 220, and a profile for a third user on a third cube face 230. The illustrated profiles may correspond to different students. However, in various embodiments, the profiles may correspond to any users, or to different sub-profiles of a single user. By rotating profile cube 200, different profiles may be selected.

In various embodiments, in response to a profile being selected, a desktop or dashboard may change the display to correspond to settings of the selected profile. As illustrated in FIG. 2, in various embodiments, the cube faces on profile cube 200 may further comprise categories, such as grades, profile, settings, etc. In various embodiments, in response to a user selecting a category, a second cube may open corresponding to the selected category. However, in various embodiments, in response to a user selecting a category, the selected category may populate the first cube face 210 of the profile cube 200. For example, in various embodiments, the first cube face 210 of the profile cube 200 may be active, and the user may select the grades category. The first cube face 210 may display information relating to the grades of the first user. For example, the first cube face 210 may display the grades for the first user for each class the first user attends. The user may further be able to select one of the classes, and a more detailed breakdown of the specific class may be displayed on the first cube face 210.

Figure 3:
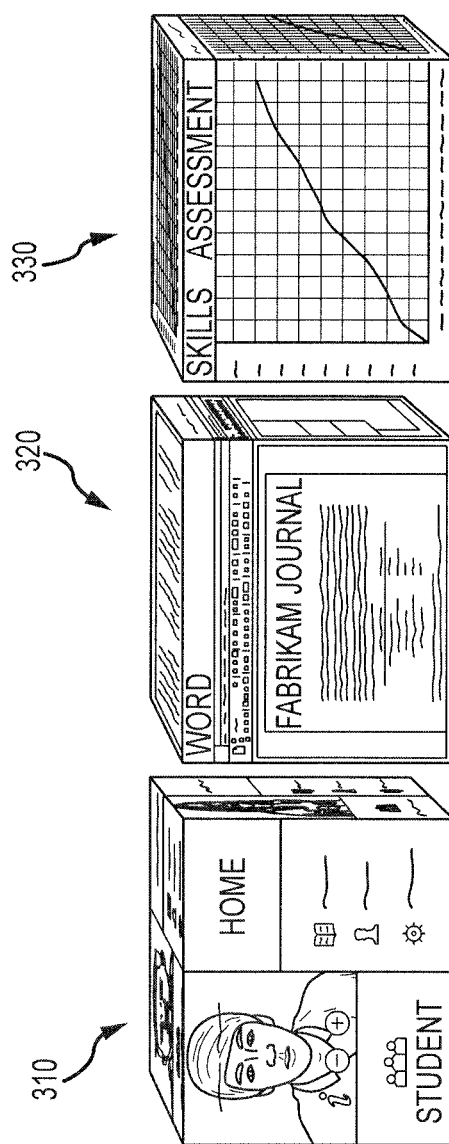
FIG. 3 illustrates a plurality of cubes including a profile cube according to various embodiments.

Referring to FIG. 3, a display comprising a plurality of cubes including a profile cube 310 is illustrated according to various embodiments. The display may further comprise an application cube 320 and an analytic cube 330. Profile cube 310 may comprise a plurality of profiles. In response to a user rotating profile cube 310 to a different active profile, one or more of the plurality of cubes may change the content to display content associated with the active profile. In various embodiments, in response to a user rotating profile cube 310 to a different active profile, the plurality of cubes may be replaced by a plurality of cubes associated with the active profile. In various embodiments, a first subset of the plurality of cubes may change in response to profile cube 310 rotating, and a second subset of the plurality of cubes may remain the same.

In various embodiments, a user may transmit a cube to a recipient. In various embodiments, the cube may be attached to an email as an attachment. A user may load a plurality of files onto a cube and therefore transmit several files as a single cube attachment. Unlike a zip file, the recipient may receive the cube and choose to open individual files on the cube faces without downloading the entire cube. The user may compress the cube prior to sending the cube in order to minimize the time and data required for the transmission.

In various embodiments, cubes may be created, edited, and/or stored on cloud computing networks. A user may upload files via a website and use the files to create cubes by adding the files to cube faces. The user may transmit cubes which are stored on the cloud to a recipient. The transmitted cubes may be compressed to minimize the time and/or data for the transmission. In various embodiments, the transmitted cube may contain links to files or cubes stored on the network, rather than the actual files or cubes themselves. The user may modify the cube or files on the cube even after the cube has been sent to the recipient, and the recipient may view the latest version of the cube when opening the cube.

In various embodiments, the recipient may receive a compressed cube. The recipient may view the various files associated with the compressed cube by rotating the compressed cube. If the recipient wishes to view or save the cube in an uncompressed, or less compressed format, the recipient may resize the cube. The recipient web client may transmit a message to the system indicating that the cube is being resized. The system may transmit the uncompressed data in order for the full sized cube to be available to the recipient.

In various embodiments, the recipient may resize the cube to any dimensions, and based on the dimensions, the system may transmit data compressed to fit the resolution of the resized dimensions. In various embodiments, the data may be transmitted dynamically and/or continuously, such that as the recipient resizes the cube, data is transmitted to the user web client based on the current cube size. Thus, it may appear to the user that the user is simply stretching the cube locally. However, unlike a compressed object being simply stretched, where resolution is diminished, the data transmitted by the system will maintain the resolution of the cube as it is resized.

In various embodiments, in response to the cube being resized, data for the enlarged cube is transmitted for only the active cube face. Thus, the system is not required to transmit data for the entire cube if the recipient is only viewing one cube face. In response to the recipient rotating the cube such that a second cube face becomes the active cube face, the system may transmit data associated with the second cube face. However, in various embodiments, the system may transmit data for the entire cube in response to the cube being resized.

Figure 4:
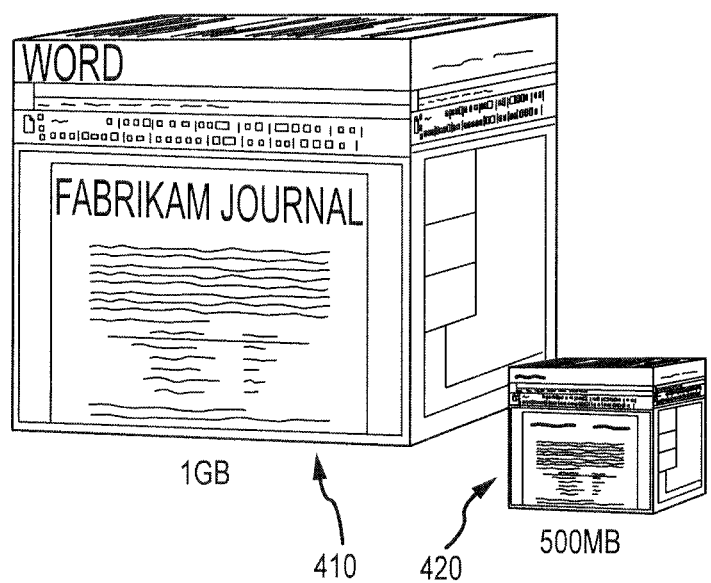
FIG. 4 illustrates a full size cube and a compressed cube according to various embodiments.

In various embodiments, a user may decide how much to compress a cube prior to sending. Referring to FIG. 4, a full size cube 410 and a compressed cube 420 are illustrated according to various embodiments. The user may select a corner of full size cube 410 and drag the corner in order to compress the full size cube 410 down to compressed cube 420. In the illustrated embodiment, the full size cube 410 is compressed from 1 GB to 500 MB. However, one skilled in the art will appreciate that cubes may be compressed to any size. A user may download, email, share, or otherwise use compressed cube 420 for any purpose. Thus compressed versions of the data of full size cube 410 may be transmitted or used without requiring the full amount of data on full size cube 410 to be transmitted.

In various embodiments, a cube web application is disclosed. Users may create an account on the cube web application. The user may login to the account with a username and password. The account may allow the user to create or upload various cubes. In various embodiments, a user may upload files to an online library. The user may select files from the online library to be inserted into a cube. The user may store a plurality of cubes in the account. The user may create albums to store the plurality of cubes. For example, the user may create photo cubes which comprise a photo on each cube face, and store the photo cubes in a photo album.

Cubes may be shared with third parties via a variety of methods. For example, a user may select a cube to be shared and may send the cube to a recipient via email, SMS, or any other method. Additionally, users may embed the cubes into social media messages or postings. The user may post a compressed cube, or a link to a cube, on a social media site. Those wishing to view the cube in full size may download the cube, or may resize the cube, in which case a less compressed version of the cube may automatically download.

In various embodiments, the user may implement security features in order to protect the cube, and/or one or more cube faces. For example, the user may password protect a first cube face. Third parties may view or download the cube. However, the third party may be required to enter a password in order to view or edit the first cube face. In various embodiments, multiple cube faces may be protected by different passwords.

In various embodiments, the cube faces may interact in order to unlock various cube faces. For example, a first cube face may comprise an assignment, and in response to a user completing the assignment, the first cube face may display a password which may be used to unlock a second cube face. In various embodiments, the second cube face may automatically unlock in response to the user completing the assignment on the first cube face.

Figure 5:
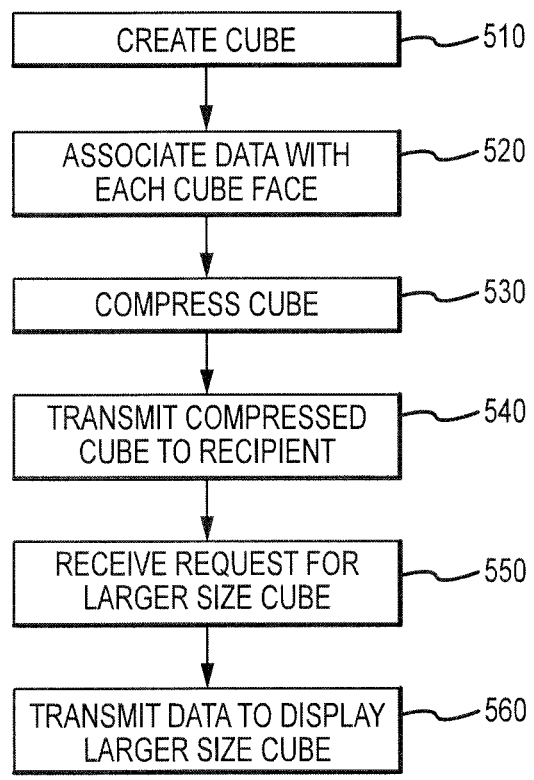
FIG. 5 illustrates a process for transmitting a compressed cube according to various embodiments.

Referring to FIG. 5, a process for creating and transmitting cubes is illustrated according to various embodiments. In step 510, a cube server creates a cube. In various embodiments, the cube server may create a blank cube. In step 520, the cube server associates data with each cube face of the cube. In various embodiments, the data may be files or applications. In various embodiments, a user may select data stored on a database to be associated with the cube faces. However, in various embodiments, a user may upload a preconfigured cube. In step 530, the cube server may compress the cube. In various embodiments, the cube server compresses the cube to a predetermined size. However, in various embodiments, the cube server compresses the cube to a size indicated by the user.

In step 540, the cube server transmits the compressed cube to a recipient. The recipient may view the compressed cube and determine whether the recipient desires to view one or more cube faces in a larger size. In step 550, the cube server may receive a request from the recipient to view the cube in a larger size. In various embodiments, the request may be to view the full size cube. However, in various embodiments, the request may be to view the cube in any size between the full size cube and the compressed cube. In step 560, the cube server may transmit data to display the cube in the larger size.

In various embodiments, cubes may be used for analytics. A first cube face of an analytic cube may comprise a graph. The graph may comprise any type of data. For example, in various embodiments, the graph may comprise a student's level of mastery of a subject over time, for example the student's level of mastery of Math. A second cube face may comprise a second graph. The second graph may comprise the student's level of mastery of English over time. A single cube may thus represent a student's progress in multiple subjects. In various embodiments, one or more graphs may be presented on each cube face.

In various embodiments, the various graphs and/or data on the cube may be displayed three-dimensionally, such that the data appears within the analytic cube. The data from the various cube faces may be merged together, such that relationships between the data may be established. In various embodiments, the user may drag one or more graph in order to create an intersection point between the graphs. The user may create a target goal in the cube. The target goal may represent a desired level of mastery for a subject.

In various embodiments, the graph data may represent a plurality of assignments which must be completed in order to achieve a proficiency level. In response to the user manipulating the graph, the analytic cube may populate a calendar with the plurality of assignments. For example, the graph may initially indicate that ten assignments are required in order to reach a particular point representing a proficiency level on the graph in ten days. The ten assignments may be calendared one per day on the calendar. In response to the user adjusting the graph such that the student should reach the same point on the graph within five days, the ten assignments may be calendared two per day on the calendar.

By merging the data, the system may display a relationship between the various graphs. For example, the graphs may indicate that a student must improve their proficiency in English by a specified amount in order to increase their proficiency in Math. Thus, rather than looking at each subject in a vacuum, the analytic cube may indicate that a deficiency in one subject is causing or otherwise related to a deficiency in another subject.

Figure 6:
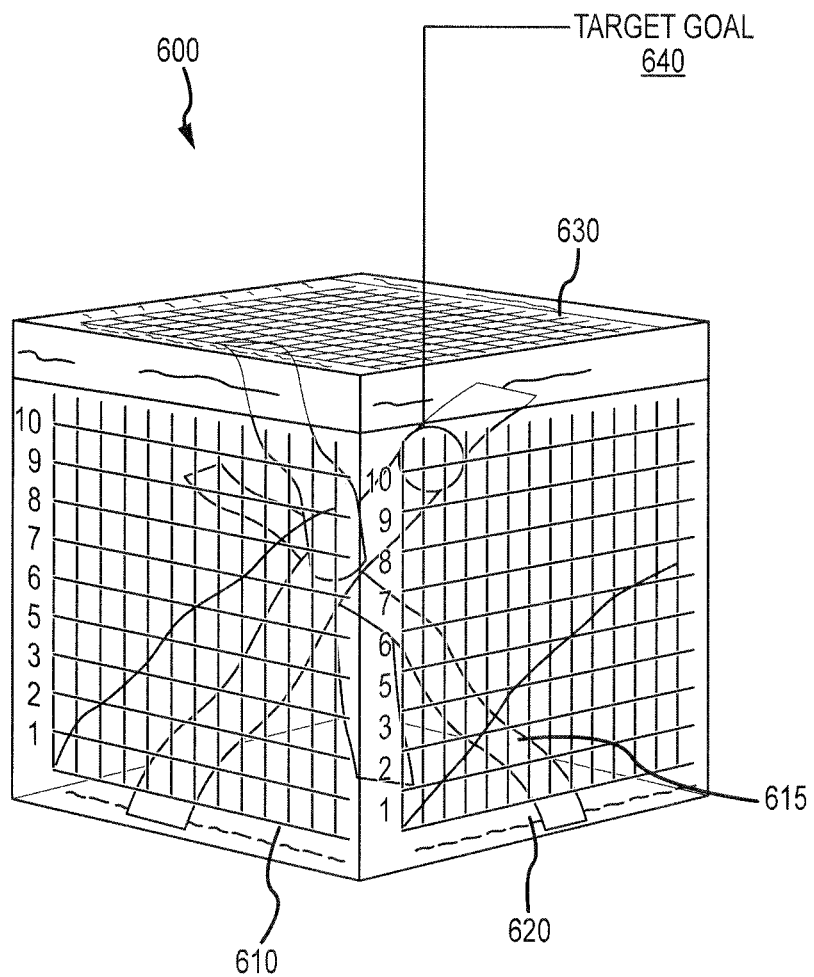
FIG. 6 illustrates an analytic cube according to various embodiments.

Referring to FIG. 6, an analytic cube 600 is illustrated according to various embodiments. Analytic cube 600 may comprise a first cube face 610, a second cube face 620, and a third cube face 630. A user may import data onto the various cube faces. For example, in the illustrated embodiment, skills assessment data for a student may be loaded onto first cube face 610, reading data may be loaded onto second cube face 620, and math data may be loaded onto third cube face 630. In various embodiments, data may be loaded onto each face of the cube. In various embodiments, analytic cube 600 may merge the data, such that the data extends in three dimensions through analytic cube 600, for example by displaying data line 615. In various embodiments, the user may insert target goal 640 into analytic cube 600. Target goal 640 may represent a desired skill level for the student. However, target goal 640 may represent any data point for any data set. In various embodiments, a user may drag data line 615, or any other data line or point, to intersect target goal 640. In response, analytic cube 600 may calculate and transmit data indicating necessary requirements in order for the student to meet target goal 640.

In various embodiments, cubes may be used in conjunction with conference calls and/or video calls. For example, each participant of a conference call may be represented on a cube face. A user may rotate the cube to view a particular participant. In various embodiments, the user may only be able to send and/or receive communications from the participant on an active cube face. For example, a first cube face may comprise all participants in the call, and the user may communicate with all users simultaneously in response to the first cube face being active. However, the user may rotate the cube to a second cube face comprising a first participant, and the user may only communicate with the first participant in response to the second cube face being active. In various embodiments, files may be uploaded onto a cube face, and the file may be displayed to the other participants on the call. In various embodiments, empty cube faces may be used to dial new participants, or to upload files. In various embodiments, the first cube face may comprise all participants in the call, and in response to the user selecting the first participant on the first cube face, the cube may rotate to display the first participant.

Figure 7:
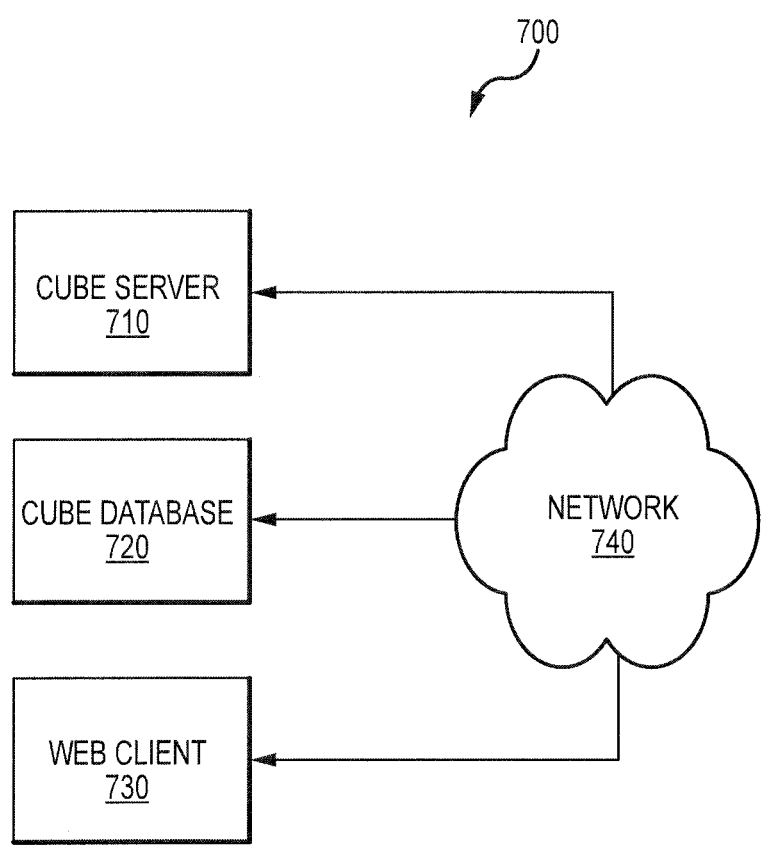
FIG. 7 illustrates a system for creating and utilizing cubes according to various embodiments.

Referring to FIG. 7, a system 700 for displaying, transmitting, and/or utilizing cubes is illustrated according to various embodiments. System 700 may comprise cube server 710, cube database 720, web client 730, and network 740. Cube server 710 may comprise any single server or combination of servers capable of creating, displaying, transmitting, and/or utilizing cubes. Cube server 710 may communicate with cube database 720 in order to retrieve stored information. Cube database 720 may comprise any database or combination of databases capable of storing information which may be accessed by cube server 710. Web client 730 may be any device, such as a personal computer, which allows a user to communicate with cube server 710. The various system components may communicate via network 740.

Web client 730 may include any device (e.g., personal computer) which communicates via any network, for example such as those discussed herein. Web client 730 may include browser applications comprising Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as iPads, iMACs, and MacBooks, kiosks, terminals, point of sale (POS) devices and/or terminals, televisions, or any other device capable of receiving data over a network. A web-client may run Microsoft Internet Explorer, Mozilla Firefox, Google Chrome, Apple Safari, or any other of the myriad software packages available for browsing the Internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client may include but is not limited to an operating system (e.g., Windows NT, 95/98/2000/CE/Mobile, OS2, UNIX, Linux, Solaris, MacOS, PalmOS, etc.) as well as various conventional support software and drivers typically associated with computers. A web client may include but is not limited to any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

Network 740 may include any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®, cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

Web client 730 may comprise any device capable of interacting with Network 740. In various embodiments, web client 730 may comprise a personal computer. However, in various embodiments web client 730 may comprise a PDA, laptop, cellular phone, GPS device, car navigation system, or any other device. Various types of web clients are described in further detail herein.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website, a uniform resource locator ("URL"), a document (e.g., a Microsoft Word document, a Microsoft Excel document, an Adobe .pdf document, etc.), an "ebook," an "emagazine," an application or microapplication (as described below), an SMS or other type of text message, an email, facebook, twitter, MMS and/or other type of communication technology. In various embodiments, a channel may be hosted or provided by a data partner. In various embodiments, the distribution channel and/or the may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include Facebook®, Foursquare®, Twitter®, MySpace®, LinkedIn®, and the like. Moreover, examples of mobile device communications include texting, email, and mobile applications for smartphones.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows NT, Windows 95/98/2000, Windows XP, Windows Vista, Windows 7, OS2, UNIX, Linux, Solaris, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEB SPHERE, WEB LOGIC, JBOSS). In various embodiments, the server may include web servers (e.g. APACHE, IIS, GWS, SUN JAVA SYSTEM WEB SERVER).

In various embodiments, components, modules, and/or engines of system 700 may be implemented as micro-applications or micro-apps. Micro-apps are typically deployed in the context of a mobile operating system, including for example, a Palm mobile operating system, a Windows mobile operating system, an Android Operating System, Apple iOS, a Blackberry operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/groups/SNS/cloud-computing/cloud-def-v15.doc (last visited Feb. 4, 2011), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Common database products that may be used to implement the databases include DB2 by IBM (Armonk, N.Y.), various database products available from Oracle Corporation (Redwood Shores, Calif.), Microsoft Access or Microsoft SQL Server by Microsoft Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with various embodiments, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, in various embodiments, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand alone interaction device configured to add, delete, modify, or augment the data in accordance with the header or trailer. As such, in various embodiments, the header or trailer is not stored on the transaction device along with the associated issuer-owned data but instead the appropriate action may be taken by providing to the transaction instrument user at the stand alone device, the appropriate option for the action to be taken. The system may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, PGP, GPG (GnuPG), and symmetric and asymmetric cryptosystems.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of ACS to further enhance security.

The computers discussed herein may provide a suitable website or other Internet-based graphical user interface which is accessible by users. In various embodiments, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In various embodiments, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WebSphere MQ™ (formerly MQSeries) by IBM, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As will be appreciated by one of ordinary skill in the art, the system may be embodied as a customization of an existing system, an add-on product, a processing apparatus executing upgraded software, a stand alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. Reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A method comprising:
generating, by a graphical user interface computer-based system, a graphical representation of a cube;
storing, by the computer-based system, a first file on a first face of the cube, wherein the cube comprises a first partial application configured to enable display of the first file;
storing, by the computer-based system, a second file on a second face of the cube, wherein the cube comprises a second partial application configured to enable display of the second file;
displaying, by the computer-based system, the first face of the cube;
rotating, by the computer-based system and in response to user input, the cube;
displaying, by the computer-based system and in response to the rotating, the second file;
saving, by the computer-based system, the cube;
compressing, by the computer-based system, the cube;
transmitting, by the computer-based system, the compressed cube as an attachment to an electronic communication;
decompressing, by the computer-based system and in response to a user resizing the cube on a user device, the first file on the first face of the cube as the resizing occurs in response to the first face being an active face of the cube, without decompressing the second file on the second face of the cube, in response to the second face being a non-active face of the cube;

determining, by the computer-based system, a native format of the first file; and displaying, by the computer-based system and in response to the user device being incompatible with the native format, the first file on the first face of the cube via the first partial application.

2. The method of claim 1, wherein the first file is associated with a first application, wherein the second file is associated with a second application, and wherein the first application and the second application are different application.

3. The method of claim 1, further comprising displaying, by the computer-based system, the first face and the second face simultaneously.

4. The method of claim 1, further comprising updating, by the computer-based system, the first file dynamically in response to a user editing the first file in a native application of the first file.

5. A method comprising:

generating, by a graphical user interface computer-based system, a representation of a three-dimensional shape;

associating, by the computer-based system, first data with a first face of the three-dimensional shape, wherein the three-dimensional shape comprises a first partial application configured to enable display of the first data;

associating, by the computer-based system, second data with a second face of the three-dimensional shape, wherein the three-dimensional shape comprises a second partial application configured to enable display of the second data;

saving, by the computer-based system, the three-dimensional shape;

compressing, by the computer-based system, three-dimensional shape;

transmitting, by the computer-based system, the compressed three-dimensional shape as an attachment to an electronic communication;

decompressing, by the computer-based system and in response to a user resizing the three-dimensional shape on a user device, the first data associated with the first face of the three-dimensional shape as the resizing occurs, in response to the first face being an active face of the three-dimensional shape, without decompressing the second data associated with the second face of the three-dimensional shape, in response to the second face being a non-active face of the three-dimensional shape;

determining, by the computer-based system, a native format of the first data; and displaying, by the computer-based system and in response to the user device being incompatible with the native format, the first data on the first face of the three-dimensional shape via the first partial application.

6. The method of claim 5, wherein the first data comprises a first file, and wherein the second data comprises a second file.

7. The method of claim 5, wherein the first data comprises a text file, and wherein the second data comprises a video file.

8. The method of claim 5, further comprising:

associating, by the computer-based system, third data with a third face of the three-dimensional shape;

associating, by the computer-based system, fourth data with a fourth face of the three-dimensional shape;

associating, by the computer-based system, fifth data with a fifth face of the three-dimensional shape; and associating, by the computer-based system, sixth data with a sixth face of the three-dimensional shape.

9. The method of claim 5, further comprising displaying, by the computer-based system, the first data;

rotating, by the computer-based system and in response to user input, the three-dimensional shape; and displaying, by the computer-based system and in response to the rotating, the second data.

10. The method of claim 5, further comprising storing, by the computer-based system, the three-dimensional shape as a file.

11. The method of claim 10, further comprising attaching, by the computer-based system, the file to the electronic communication.

12. The method of claim 5, further comprising compressing, by the computer-based system, the three-dimensional shape into a compressed file.

13. The method of claim 12, further comprising:

transmitting, by the computer-based system, the compressed file to a recipient;

receiving, by the computer-based system, a request from the recipient for the three-dimensional shape; and transmitting, by the computer-based system, the three-dimensional shape to the recipient.

14. The method of claim 5, wherein the first data comprises a first profile, and wherein the second data comprises a second profile.

15. The method of claim 14, further comprising:

rotating, by the computer-based system, the three-dimensional shape from the first face to the second face; and changing, by the computer-based system and in response to the rotating, at least one of content on a screen and display settings of the screen from first settings associated with the first profile to second settings associated with the second profile.

16. The method of claim 15, wherein the first profile is associated with a first user, and wherein the second profile is associated with a second user.

17. The method of claim 5, further comprising merging, by the computer-based system, the first data and the second data, such that data lines extend through the three-dimensional shape in three dimensions.

18. The method of claim 5, further comprising creating, by the computer-based system, a target goal within the three-dimensional shape.

19. The method of claim 5, further comprising displaying, by the computer-based system, a key on the first face.

20. The method of claim 19, further comprising:

receiving, by the computer-based system, a selection of an item in the key; and rotating, by the computer-based system and in response to the selection, the three-dimensional shape to a face corresponding to the selection.

21. The method of claim 5, further comprising:

receiving, by the computer-based system, a selection of a first category displayed on the first face; and generating, by the computer-based system, a sub-profile three-dimensional shape corresponding to the first category.

22. An article of manufacture including a non-transitory, tangible computer readable storage medium having instructions stored thereon that, in response to execution by a graphical user interface computer-based system, cause the computer-based system to perform operations comprising:

generating, by the computer-based system, a representation of a three-dimensional shape;

associating, by the computer-based system, first data with a first face of the three-dimensional shape;

generating, by the computer-based system, a second representation of a second three-dimensional shape;

associating, by the computer-based system, the second three-dimensional shape with the first face of the three-dimensional shape, wherein the second three-dimensional shape is organized as a folder structure;

associating, by the computer-based system, second data with a second face of the three-dimensional shape;

saving, by the computer-based system, the three-dimensional shape;

compressing, by the computer-based system, three-dimensional shape;

transmitting, by the computer-based system, the compressed three-dimensional shape as an attachment to an electronic communication;

decompressing, by the computer-based system and in response to a user resizing the three-dimensional shape on a user device, the first data associated with the first face of the three-dimensional shape as the resizing occurs, in response to the first face being an active face of the three-dimensional shape, without decompressing the second data associated with the second face of the three-dimensional shape, in response to the second face being a non-active face of the three-dimensional shape;

determining, by the computer-based system, a native format of the first data; and converting, by the computer-based system and in response to the user device being incompatible with the native format, the first data into image data.

23. The article of manufacture of claim 22, the operations further comprising:

rotating, by the computer-based system, the three-dimensional shape from the first face to the second face; and changing, by the computer-based system and in response to the rotating, at least one of content on a screen and display settings of the screen from first settings associated with a first profile to second settings associated with a second profile.

24. The article of manufacture of claim 22, wherein the electronic communication is an email.

25. The article of manufacture of claim 22, wherein the first data comprises a first participant in a conference call, and wherein the second data comprises a second participant in the conference call.

26. A system comprising:

a graphical user interface processor, a tangible, non-transitory memory configured to communicate with the processor, the tangible, non-transitory memory having instructions stored thereon that, in response to execution by the processor, cause the processor to perform operations comprising:

generating, by the processor, a representation of a three-dimensional shape;

associating, by the processor, first data and a first application with a first face of the three-dimensional shape;

associating, by the processor, second data and a second application with a second face of the three-dimensional shape, wherein the second application is different from the first application;

saving, by the processor, the three-dimensional shape;

compressing, by the processor, three-dimensional shape;

transmitting, by the processor, the compressed three-dimensional shape as an attachment to an electronic communication;

decompressing, by the processor and in response to a user resizing the three-dimensional shape on a user device, the first data and the first application associated with the first face of the three-dimensional shape as the resizing occurs, in response to the first face being an active face of the three-dimensional shape, without decompressing the second data and the second application associated with the second face of the three-dimensional shape, in response to the second face being a non-active face of the three-dimensional shape;

determining, by the processor, a native format of the first data;

converting, by the processor and in response to the user device being incompatible with the native format, the first data into image data;

updating, by the processor, the first data dynamically in response to the user editing the first data in a native application of the first data;

creating, by the processor, a target goal within the three-dimensional shape;

displaying, by the processor, a key on the active face; and rotating, by the processor, the three-dimensional shape in response to a selection of an item in the key.

27. The system of claim 26, the operations further comprising:

resizing, by the processor, the three-dimensional shape.

28. The system of claim 26, the operations further comprising:

dynamically transmitting, by the processor and in response to the user resizing the three-dimensional shape, data to display the three-dimensional shape as the resizing occurs.

29. The system of claim 26, wherein the compressed three-dimensional shape comprises a link to the three dimensional shape.

30. The system of claim 26, wherein the first data comprises an assignment, wherein the second data is locked, and wherein the operations further comprise unlocking, by the computer-based system, the second data in response to a user completing the assignment.

\* \* \* \* \*